(12) United States Patent
McGrew (10) Patent No.: US 8,699,137 B2
(45) Date of Patent: Apr. 15, 2014

(54) AGILE OPTICAL PHASED ARRAY DEVICE AND APPLICATIONS

(75) Inventor: Stephen Paul McGrew, Spokane, WA (US)

(73) Assignee: Vuzix Corporation, Rochester, NY (US)

( * ) Notice: Subject to any disclaimer, the term of this patent is extended or adjusted under 35 U.S.C. 154(b) by 233 days.

(21) Appl. No.: 13/195,539

(22) Filed: Aug. 1, 2011

(65) Prior Publication Data

US 2011/0286063 A1     Nov. 24, 2011

Related U.S. Application Data

(63) Continuation of application No. 12/061,390, filed on Apr. 2, 2008, now Pat. No. 8,014,050.

(60) Provisional application No. 60/909,515, filed on Apr. 2, 2007.

(51) Int. Cl.
    *G02B 5/18* (2006.01)
(52) U.S. Cl.
    USPC .............................. 359/572; 359/573; 359/630
(58) Field of Classification Search
    USPC ............... 359/13, 15, 34, 245, 263, 276, 279, 359/315, 318–322, 572, 573, 630, 634; 385/1–8, 37
    See application file for complete search history.

(56) References Cited

U.S. PATENT DOCUMENTS

| 3,813,142 | A | * | 5/1974 | Buhrer .............................. 385/10 |
| 4,115,747 | A | * | 9/1978 | Sato et al. ........................ 372/26 |
| 4,992,880 | A | * | 2/1991 | Trias ............................. 348/761 |
| 5,115,344 | A | * | 5/1992 | Jaskie ............................ 359/573 |
| 5,173,790 | A | * | 12/1992 | Montgomery .................... 359/7 |
| 5,303,043 | A | * | 4/1994 | Glenn .............................. 348/40 |
| 5,737,113 | A | * | 4/1998 | Kuramochi et al. ........... 359/259 |
| 5,801,874 | A | * | 9/1998 | Montgomery et al. ........ 359/305 |
| 5,973,727 | A | * | 10/1999 | McGrew et al. ................. 348/41 |
| 6,040,910 | A | * | 3/2000 | Wu et al. ........................ 356/613 |
| 6,043,924 | A | * | 3/2000 | Montgomery et al. ....... 359/285 |
| 6,052,215 | A | * | 4/2000 | Montgomery et al. ....... 359/285 |

(Continued)

OTHER PUBLICATIONS

"Analysis of Interdigital Electro-optic Bragg Diffraction Grating", Optical and Quantum Electronics, vol. 37, No. 12, pp. 1099-1108, Sep. 5, www.springerlink.com.*

(Continued)

*Primary Examiner* — Frank Font
(74) *Attorney, Agent, or Firm* — Brian B. Shaw, Esq.; Thomas B. Ryan; Harter Secrest & Emery LLP (57) ABSTRACT

A device that provides light beam switching, agile steering of the light beam over a range of angles, and generation of arbitrary wavefront shapes with high spatial and temporal resolution. The agile device can include a volume diffractive structure comprising Bragg planes having one refractive index and the Bragg planes separated by regions containing an active optical medium. Electrodes (which may be the Bragg planes themselves, or may be arrayed adjacent to the active optical medium) are used to control the electric field intensity and direction across the structure, and thereby control the diffraction efficiency of the structure and the local phase delay imposed on a diffracted wavefront. Means are provided for addressing the many thousands of electrodes required for precise and rapid wavefront control. Applications include free-space atmospheric optical communications, near-eye displays, direct-view 3D displays, optical switching, and a host of other applications.

11 Claims, 9 Drawing Sheets

(56) References Cited

U.S. PATENT DOCUMENTS

| | | | |
|---|---|---|---|
| 6,181,367 B1* | 1/2001 | McGrew et al. | 348/41 |
| 6,243,199 B1* | 6/2001 | Hansen et al. | 359/485.05 |
| 6,473,238 B1* | 10/2002 | Daniell | 359/622 |
| 6,538,690 B1* | 3/2003 | Montgomery et al. | 348/198 |
| 6,664,706 B1* | 12/2003 | Hung et al. | 310/309 |
| 6,690,500 B2* | 2/2004 | Ogasawara et al. | 359/245 |
| 6,804,429 B2* | 10/2004 | Yu et al. | 385/24 |
| 6,903,872 B2* | 6/2005 | Schrader | 359/572 |
| 6,975,765 B2* | 12/2005 | McGrew et al. | 382/210 |
| 7,215,852 B2* | 5/2007 | Doerr et al. | 385/46 |
| 7,227,704 B2* | 6/2007 | Koike | 359/719 |
| 7,333,611 B1* | 2/2008 | Yuen et al. | 380/256 |
| 7,538,891 B1* | 5/2009 | Mello et al. | 356/520 |
| 7,570,405 B1* | 8/2009 | Sutherland et al. | 359/15 |
| 7,625,674 B2* | 12/2009 | Sharma et al. | 430/2 |
| 2002/0031291 A1* | 3/2002 | Montgomery et al. | 385/7 |
| 2004/0008391 A1* | 1/2004 | Bowley et al. | 359/3 |
| 2004/0190573 A1* | 9/2004 | Kruschwitz et al. | 372/39 |
| 2004/0218390 A1* | 11/2004 | Holman et al. | 362/245 |
| 2005/0264813 A1* | 12/2005 | Giakos | 356/369 |
| 2006/0066939 A1* | 3/2006 | Kimura | 359/321 |
| 2006/0215244 A1* | 9/2006 | Yosha et al. | 359/15 |
| 2006/0268241 A1* | 11/2006 | Watson et al. | 353/94 |
| 2006/0280219 A1* | 12/2006 | Shchegrov | 372/99 |
| 2006/0290899 A1* | 12/2006 | Davis et al. | 353/81 |
| 2008/0218862 A1* | 9/2008 | Kekas | 359/573 |

OTHER PUBLICATIONS

Zhang et al., "High-efficiency, liquid-crystal-based, controllable diffraction grating," Abstract, J. Opt. Soc. Am. A 22, (2005).*

Sato et al, "A new electrically controllable diffraction grating using polarization reflection", Journal of Applied Physics, Sep. 1976, vol. 47, Issue 9, pp. 4031-4032.*

Sasaki et al., "Diffraction Properties of nematic Phase Grating with Photoregulated Liquid Crystal Cells", Japanese Journal of Applied Physics, vol. 46, No. 2, 2007, pp. 698-702.*

"Liquid Crystals: a Simple View on a Complex Matter", 4. Anisotropy in Liquid Crystals, http://dept.kent.edu/spie/liquidcrystals/maintypes3.html.*

Jepsen et al., "Liquid-crystal-filled gratings with high diffraction efficiency", Optic Letters, Jul. 15, 1996, vol. 21, No. 14, pp. 1081-1083.*

Naumov et al., "Control Optimization of spherical modal liquid crystal lenses", Optics Express, Apr. 26, 1999, vol. 4, No. 9, pp. 344-352.*

Xu et al., "Wire-grid diffraction gratings used as polarizing beam splitter for visible light and applied in liquid crystal on silicon", Optics Express, Apr. 4, 2005, vol. 13, No. 7, pp. 2303-2320.*

Zhang et al., "Integrated liquid crystal optical switch based on total internal reflection", Applied Physics Letters 86, 211108 (2005), American Institute of Physics.*

H. Ren et al., "In-plane switching liquid crystal gel for polarization-independent light switch", Journal of Applied Physics, vol. 96, No. 7, Oct. 1, 2004, pp. 3609-3611.*

P. Hands et al., "Adaptive modally addressed liquid crystal lenses", Liquid Crystals VIII. Edited by Khoo, Iam-Choon. Proceedings of the SPI E, vol. 5518, pp. 136-143 (2004).*

M Loktev et al.,"Wave front control systems based on modal liquid crystal lenses", Review of Scientific Instruments, vol. 71, Issue 9, pp. 3290-3297 (2000).*

R. H. Johnson and R. M. Montgomery, "Optical beam deflection using acoustic-traveling wave technology", published in Proc. SPIE, Acousto-Optics/Instrumentation/Applications, vol. 90, p. 43, Aug. 1976.*

L. Onural et al., "New high-resolution display device for holographic three dimensional video: principles and simulations", Optical Engineering, Mar. 1994, vol. 33, No. 3, p. 835.*

Smalley et al., MIT Media Lab in the MTL Annual Research report Sep. 2006.*

B. Maune et al., "Liquid-crystal electri tuning of a photonic crystal laser", Applied Physics Letters, Jul. 19, 2004, vol. 85, No. 3, 2004 American Institute of Physics, pp. 360-362.*

O.A. Zayakin et al., "Cylindrical adaptive lenses".*

Hustson, Stu, "Smart glasses switch focus in an instant", Newscientisttech.com, Apr. 3, 2006.*

Beiser, Leo, "Scanner Devices and Technology", Unified Optical Scanning Technology, Published Online: Jan. 28, 2005, John Wiley & Sons, Inc. Chapter 4, pp. 122-126.*

A. Naumov et al., "Liquid-crystal adaptive lenses with modal control," Optics Letters 23, 992-994 (1998).*

* cited by examiner

AGILE OPTICAL PHASED ARRAY DEVICE AND APPLICATIONS

CROSS-REFERENCE TO RELATED APPLICATIONS

This application is a continuation of U.S. patent application Ser. No. 12/061,390, filed Apr. 2, 2008, now U.S. Pat. No. 8,014,050, which is a nonprovisional of U.S. Provisional Application No. 60/909,515 filed Apr. 2, 2007. U.S. patent application Ser. No. 12/061,390 is hereby incorporated by reference.

TECHNICAL FIELD

The invention relates to optical switches, beam steerers, and traveling lenses for such purposes as switching, shaping, and angularly steering beams for near-eye displays, direct-view 3D displays, and other display, control, or communication applications.

BACKGROUND OF THE INVENTION

One object of this invention is to provide a fast optical beam steerer with no mechanical moving parts such as oscillating mirrors, and to use the beam steerer alone or in combination with other beam steerers in near-eye displays or other display, control or communications applications.

In this disclosure, "beam steerer" refers to any device that redirects the direction of propagation of electromagnetic radiation in a continuously time-varying fashion. That is, for purposes of this disclosure, a device that is inherently non-continuous such as a sequence of switchable prisms or diffraction gratings would not be considered a beam steerer, but a variable-index prism or a continuously variable-focus lens would be considered a beam steerer. Although this disclosure will usually use the term "light" for convenience to refer to electromagnetic radiation, it should be understood that the term is intended to include visible, ultraviolet, infra-red, deep infra-red, terahertz, microwave, and other such electromagnetic radiation. Similarly, such terms as "wavelength of light" are intended to refer generally to a referenced property of electromagnetic radiation (i.e., wavelength). Accordingly, the term "beam steerer" refers generally to any continuously variable optical element, including for example traveling lenses, variable prisms, variable focal length lenses, deformable mirrors, oscillating mirrors, spatial phase modulators, and so on.

In the prior art, there are many different kinds of beam steerers implemented, including:
  Acousto-optic Bragg cells
  Acousto-optic pulsed traveling lenses
  Acousto-optic phase modulators
  Variable electro-optic prisms
  Variable focus liquid crystal lenses
  Liquid crystal spatial phase modulators
  Liquid crystal variable focus mirrors
  Kerr cells
  Deformable mirrors Also in the prior art, there are various switched optical devices such as H-PDLC switchable holograms and POLIC-RYPS switchable gratings; and the prior art also includes electro-optically variable diffraction efficiency gratings.

SUMMARY OF THE INVENTION

The present invention among its preferred embodiments steers a light beam through a continuous range of angles by diffracting the light beam through a diffractive structure and superimposing a locally spatially periodic varying phase or amplitude modulation onto the diffracted light beam. Without the modulation, the light beam would be diffracted into one or more fundamental Nth order diffracted beam directions by the diffractive structure. However, locally spatially periodic varying modulation causes the light beam to diffract into "sidebands": angles spaced to either side of the original Nth order diffracted beam directions by an amount that depends on the spatial period of the modulation, the wavelength of the diffracted light, and the angle of the fundamental Nth order beam direction. Hereafter within this disclosure I refer to the "sidebands" as Mth sub-orders of Nth fundamental diffracted orders.

By varying the spatial period of the modulation, it is possible to vary the direction into which a particular Mth suborder of a particular Nth fundamental order Nth order beam is diffracted. By varying the spatial period in a linear fashion, it is possible to direct a collimated beam into other directions while keeping it collimated. By spatially varying the spatial frequency in a quadratic fashion, it is possible to diffract a collimated beam to a focus or diffract it as if from a virtual focus. By spatially varying the spatial frequency in a quadratic fashion while translating the pattern of spatial frequency variation across the device at a constant velocity, it is possible to effect a traveling lens. In general, with this invention it is possible to control the diffracted wavefront in the Mth suborder of the Nth fundamental order with high spatial and temporal resolution by controlling the spatial frequency of modulation both temporally and spatially.

One version of the invention as an agile holographic phased array for electromagnetic radiation includes a first diffractive structure that diffracts electromagnetic radiation into one or more fundamental diffractive orders. A spatial and temporal modulator adjusts the phase shift undergone by electromagnetic radiation diffracted from the diffractive structure in a predetermined spatial and temporal pattern.

The spatial and temporal pattern can have (a) a spatial resolution finer than 1000 wavelengths of the electromagnetic radiation and (b) a temporal resolution finer than 1 second, such that the spatial and temporal modulator can generate diffraction suborders from the one or more fundamental diffracted orders. The direction of propagation of the suborders can be determined by the spatial frequency of the spatial and temporal pattern of phase shift.

Predetermined zones of the first diffractive structure are preferably switchable. The spatial and temporal modulator can be a second diffractive structure whose period and amplitude are independently controllable in multiple regions on the second structure. Together, the first diffractive structure and the spatial and temporal modulator preferably comprise a single electro-optically controllable layer.

The first diffractive structure is preferably configured to diffract electromagnetic radiation out of a totally internally reflected mode within a high refractive index medium, primarily into a single diffracted order that exits the high refractive index medium into a lower refractive index medium. The first diffractive structure is further preferably configured to diffract electromagnetic radiation of different wavelengths independently.

The electro-optically controllable layer preferably includes a series of transparent dielectric vanes arrayed on a surface and separated by distances smaller than 1000 wavelengths of the electromagnetic radiation and larger than one-half of a wavelength of the electromagnetic radiation. The vanes are preferably tilted at an angle to the surface normal and separated by spaces filled with electro-optically active material. In addition, the controllable layer includes an array of transparent electrodes proximate to the controllable layer and the electrodes are addressable so that a predetermined spatial and temporal pattern of voltages can be applied to the electrodes, thereby imposing a corresponding spatial and temporal pattern of phase and/or amplitude modulation onto electromagnetic radiation diffracted by the agile holographic phased array.

Alternatively, the first diffractive structure and the spatial and temporal modulator can be separate but proximately positioned devices. Preferably, the first diffractive structure comprises a POLICRYPS or H-PDLC structure. In particular, the first diffractive structure preferably includes a series of transparent electrically conductive vanes arrayed on a surface and separated by distances smaller than 1000 wavelengths of the electromagnetic radiation and larger than one-half of a wavelength of the electromagnetic radiation. The vanes are tilted at an angle to the surface normal and separated by spaces filled with electro-optically active material. The vanes also serve as electrodes for imposing electric fields across the electro-optically active material in a direction perpendicular to the vane surfaces.

DETAILED DESCRIPTION OF THE INVENTION

Figure 1:
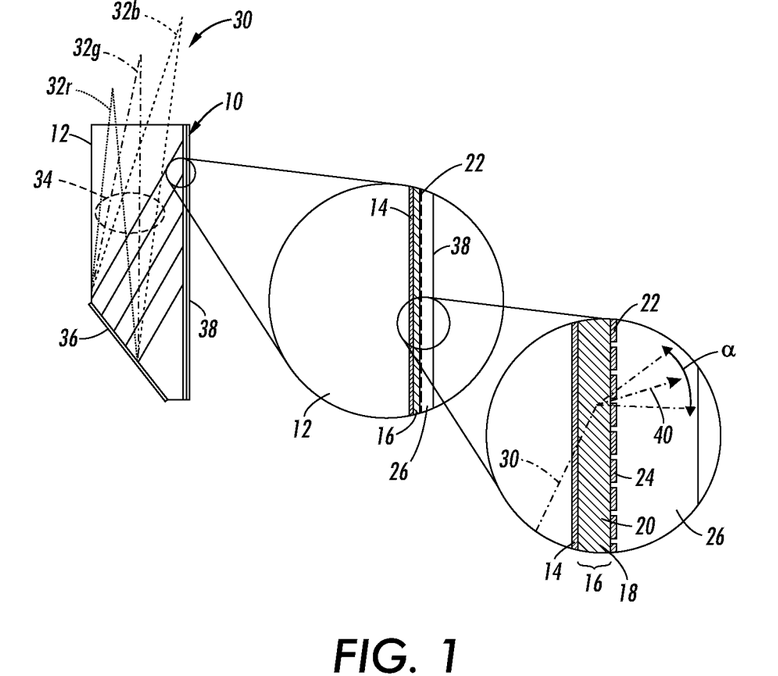
FIG. 1 is a side view of a holographic phased array with progressively enlarged breakaway sections.

A preferred embodiment of the invention is a holographic phased array 10 as shown in FIG. 1. A glass substrate 12 has a continuous transparent electrode 14 on one surface. The glass may be for example fused silica or fused quartz having a refractive index of around 1.5. On the transparent electrode 14, a layer 16 contains a diffractive structure composed of tilted vanes 18 of dielectric material (e.g., a cured photopolymer) alternating with spaces 20 filled with nematic liquid crystal. The diffractive layer 16 can be 2 microns thick with (a) the vanes 18 having a matching axial length (i.e., a length in the thickness direction of the diffractive layer 16), a transverse width of 250 nanometers, and an inclination of 10 degrees from the substrate's surface normal and (b) the interstitial spaces 20 also having a matching 2 micron length and a transverse width of 250 nanometers. Thus, the period of the diffractive structure within the diffractive layer 16 is 500 nanometers. On or adjacent to diffractive layer 16 is an array 22 of individually addressable transparent strip electrodes 24, each approximately 400 nanometers wide and separated by 100 nanometers. Overlying the array 22 of strip electrodes 24 is a glass cover plate 26 having approximately the same refractive index as the substrate 12, the dielectric material of the vanes 18, and the ordinary refractive index of the liquid crystal material within the interstitial spaces 20.

A nonconductive transparent material, which has a refractive index close to that of the transparent electrodes 14 and 24, may be used as a planarization layer 28 to minimize unwanted diffraction from the strip electrodes 24. In addition, an antireflection layer (not shown) can be applied between the planarization layer 28 and the diffractive layer 16 to minimize reflections from the interface between them.

Light 30 from rows of red, green, and blue LEDs 32r, 32g, and 32b, respectively, enters the substrate 12 through a lens 34, travels longitudinally through the substrate 12 to impinge upon a holographic optical element 36, where the light 30 diffracts toward the diffractive structure in the layer 16 at an angle of 75 degrees to the substrate normal. If the liquid crystal in the spaces 20 is in its ordinary state so that its refractive index matches that of the dielectric vanes 18, the light passes through layer 16 without diffraction, strikes a glass/air interface 38 of cover plate 26, and is totally internally reflected from interface 38 back into the substrate 12.

However, if the liquid crystal in the spaces 20 is in its extraordinary state, for example because of a voltage difference between electrodes 24 in the array 22 and electrode 14, the light 30 will be diffracted from the diffractive structure in layer 16 and will exit the cover plate 26 as a diffracted beam 40 in one or more directions α, such as a direction perpendicular to the cover plate 26.

Figure 2:
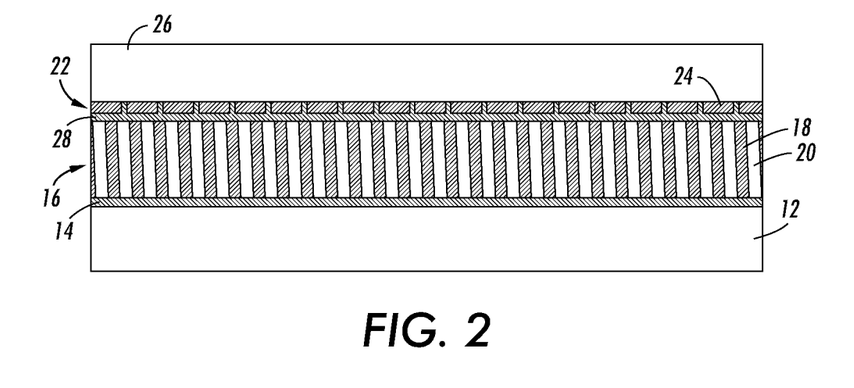
FIG. 2 is a greatly enlarged side view of a diffractive structure within a layer of the phased array.

FIG. 2 is a close-up view of the diffractive structure in layer 116, showing vanes 18 separated by spaces 20 filled with liquid crystal material.

Figure 3A:
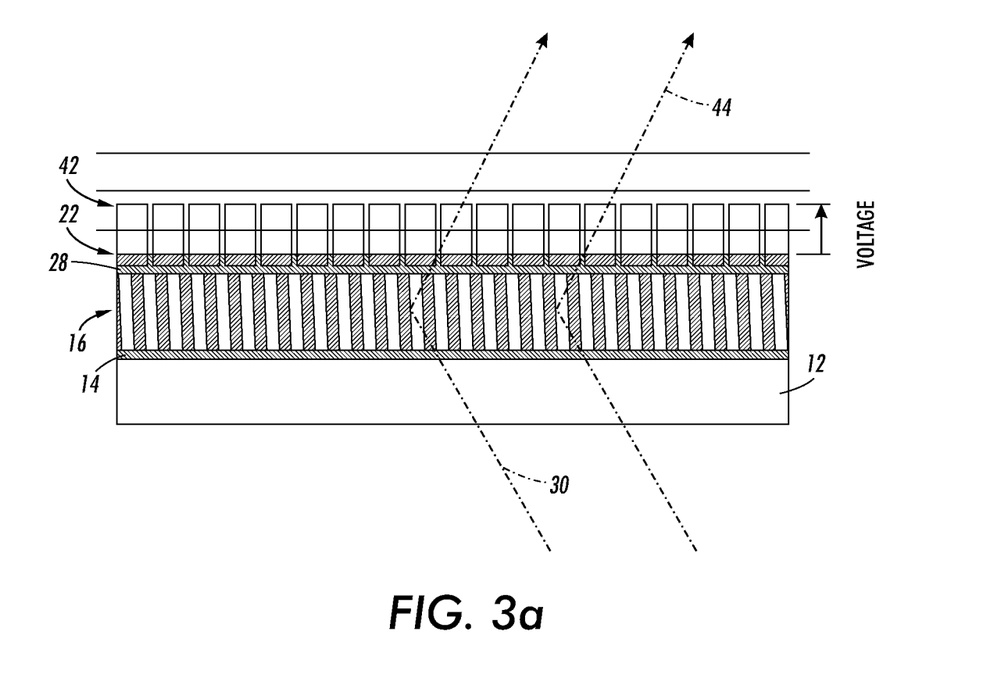
FIGS. 3a-3c are side views of the same diffractive structure with superimposed bar charts showing relative amounts of voltage applied to electrodes of the array and resulting paths of light rays steered by the array.
Figure 3B:
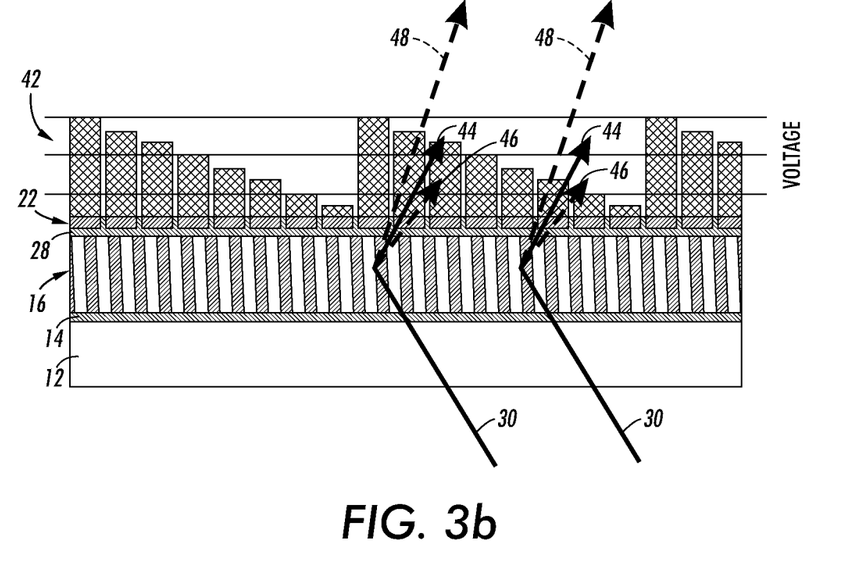
Figure 3C:
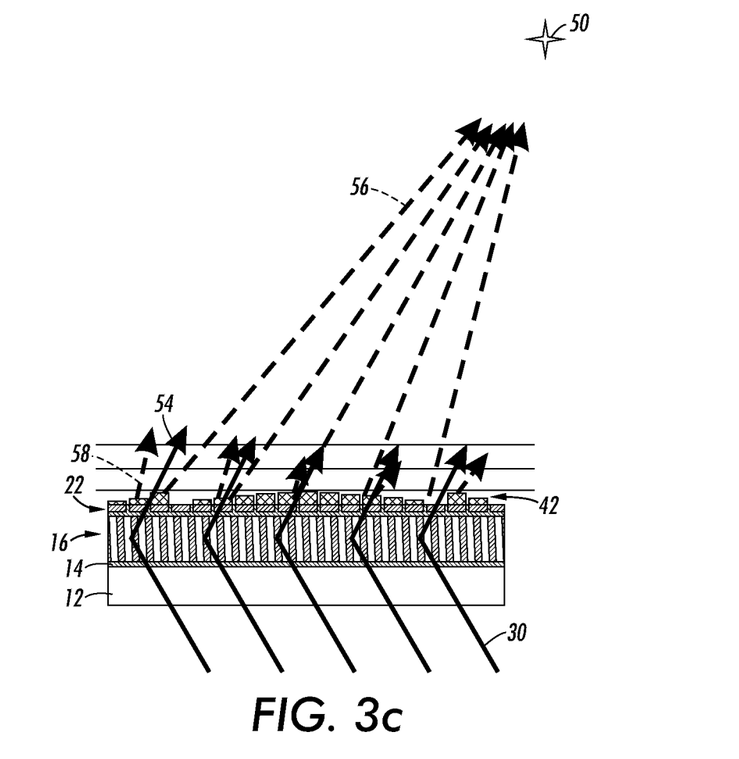

FIGS. 3a, 3b and 3c illustrate the beam steering function of the device in FIG. 1. In each of FIGS. 3a, 3b, and 3c, the holographic phased array 10 of FIG. 1 is shown with the cover glass 26 removed, and a bar chart 42 is shown on top of the electrode array 22, with the bar height indicating the voltage to which each electrode 24 is charged relative to the uninterrupted electrode 14. In FIG. 3a, all of the electrodes 24 in the array 22 are charged to the same voltage, while the uninterrupted electrode 14 is charged to a higher or lower voltage than the electrode array 22. In this case, the diffractive layer 16 will contain a nearly uniform electric field directed normal to the substrate 12, and essentially all diffracted light will exit the cover plate in a single direction as a +1 diffracted order beam 44 as shown in FIG. 3a because the phase and amplitude of the light wavefront is essentially constant in the diffracted beam 44.

However, if the electrodes 24 in the array 22 are charged in such a way that the voltage follows a sawtooth spatial pattern as indicated in FIG. 3b, the light 30 will be diffracted additionally into at least one sub-order 46 or 48, in accordance with well-known diffraction principles, and probably diffracted as well into other sub-orders. The +1 sub-order 46, the zero (fundamental) order 44, and the −1 sub-order 48 are shown as vectors in FIGS. 3a, 3b, and 3c, with length indicating relative intensity. This additional diffraction into sub-orders will occur whether or not the diffraction efficiency of the diffractive structure in layer 16 varies with electrode voltage, as long as the optical phase delay for light diffracted from the structure is dependent on electrode voltage. Similarly, it will occur if only the diffraction efficiency of the structure is modulated by electrode voltage, because an amplitude variation at one point in the propagation of a wave is converted to a phase variation downstream and thus to a variation in the direction of propagation.

In FIG. 3c, a voltage pattern corresponding to a Fresnel lens is imposed on the electrodes 24, resulting in a distribution of light primarily into a single sub-order 56 that converges to a point 50. A possible distribution is indicated by the length of the vectors representing the other sub-orders 58. In the example of FIG. 3c, most of the light originally diffracted into the +1 fundamental order 54 is diverted into the −1 sub-order 56 because of the voltage pattern. Careful selection of the profile of the voltage pattern and care to ensure that the phase delay at each peak in the pattern is very close to 1 wavelength of the light, with that the amount of phase delay corresponding to the desired phase function, can result in as much as 90% or more of the light being concentrated into this −1 sub-order.

Figure 4:
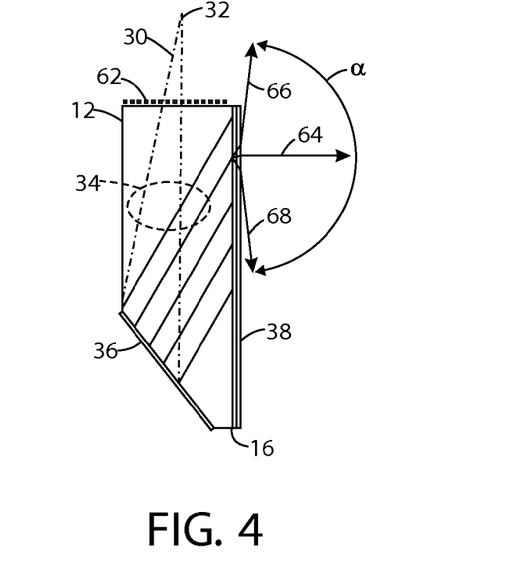
FIG. 4 is a side view of the phased array showing a range of angles through which the light can be steered.

FIG. 4 illustrates the potential scanning range a of diffraction angle of the +1 sub-order of the +1 fundamental diffracted order in the device of FIG. 1. Note that a diffraction grating 62 has been added to pre-disperse the spectral components of the incident light so that diffractive elements 36 and 16 will reverse the dispersion, resulting in minimal spectral dispersion. For light having a nominal wavelength of 700 nanometers, incident on the active layer 16 at the angle of 70 degrees, the first order fundamental diffracted order 64 exits the cover plate 26 at an angle normal to the substrate 12. The largest possible angle of deviation from the +1 fundamental diffracted order into the +1 suborder, given an electrode spacing of 500 nanometers, is plus or minus 90 degrees. The smallest angle of deviation is zero, so the range of deviation, or the scanning range, of the +1 sub-order is from minus 90 degrees to +90 degrees from normal. It will be evident to any skilled practitioner in the art of diffractive element design that shorter spatial periods in the voltage pattern will correspond to wider deviation angles for the −1 sub-order, and that the amount of light distributed into each of the various sub-orders will depend on the precision of wavefront shaping, which in turn depends on the number of electrodes available to define each region of the voltage pattern. Fewer electrodes (shorter periods) will result usually in (a) less precision and (b) a larger proportion of light being distributed among other sub-orders. In order to obtain a full 180 degree scanning range, electrode spacing must be less than about 0.7× the wavelength of light being manipulated.

Figure 5A:
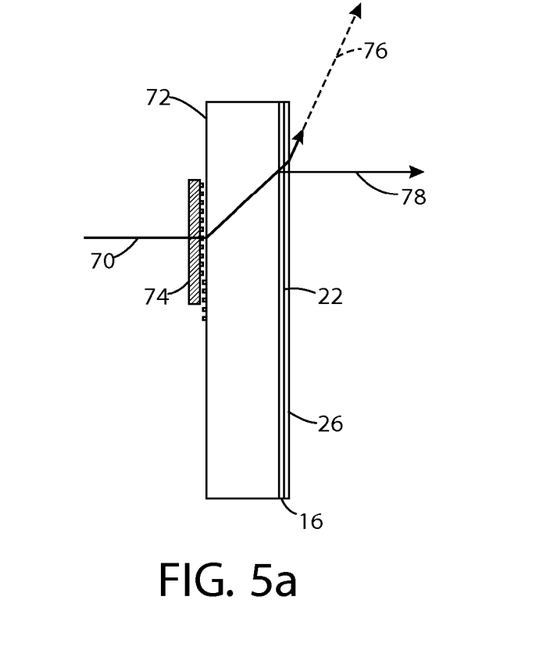
FIGS. 5a and 5b are side views of an alternative holographic phased array with FIG. 5b showing light diffracted through different orders and suborders.

Another embodiment does not require the total internal reflection of FIG. 1. In the device of FIG. 5, an array 22 of electrodes, a glass cover 26, and a diffractive layer 16 essentially identical to that of FIG. 1 are mounted on a glass plate substrate 72, and light 70 enters the substrate 72 through a diffraction grating 74. The incident light cannot be totally internally reflected by the front surface of the glass cover 26, so a large portion of the light 70 transmits through the glass cover 26 as the beam 76 when the diffractive layer 16 is in its "off" state. However, if the thickness, vane spacing and tilt within the diffractive layer 16 are selected according to well-known principles of Bragg diffraction to correspond to the wavelength of the light 70, refractive index distribution in the layer 16, and the desired direction of fundamental first-order diffracted light, then a very large fraction of incident light 70 (e.g., up to 95% or more) will be diffracted into the +1 fundamental order 78 when the active layer is in its "on" state. If the thickness of layer 16 is very small, light may be diffracted into several fundamental diffracted orders as shown in FIG. 5b.

Figure 5B:
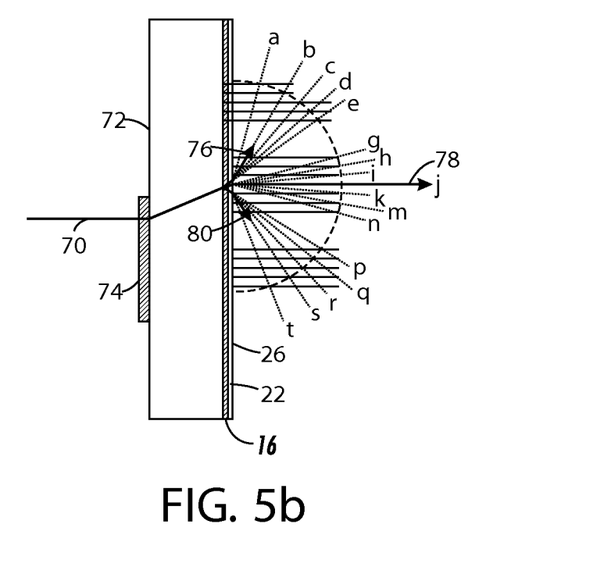

In FIG. 5b, the fundamental zero order diffracted beam 76 is labeled b, the fundamental plus one order diffracted beam 78 is labeled j, and the fundamental plus two order diffracted beam 80 is labeled s. There is no minus one fundamental diffracted order because the zero order is at too extreme an angle. Around the zero order fundamental diffracted order b, there are several sub-orders shown: a, c, d and e, which are the minus one, plus one, plus two and plus three sub-orders. There is no minus two sub-order of the zero-order fundamental order because of the extreme angle of the zero order beam, although there could be higher sub-orders than the plus three sub-order. Around the plus one fundamental order j there are six sub-orders shown, the minus sub-orders labeled g, h, and i, and the plus sub-orders labeled k, m, and n. Similarly, around the plus two fundamental order s are shown four suborders: three minus sub-orders labeled p, q, and r, and one plus sub-order labeled t. There are no further plus sub-orders because the angle of the second fundamental diffracted order is too extreme.

Nonetheless, a properly shaped sawtooth modulation such as that indicated in FIG. 3b can guide a large fraction of light into a single sideband a, c, d, e, f, g, h, i, k, l, m, n, p, q, r, or t of one of the single fundamental diffracted orders b, j, and s. By proper selection of the modulation depth (maximum phase delay) and slope in the device of FIG. 3b, light can be diverted primarily into any desired sideband.

Figure 6:
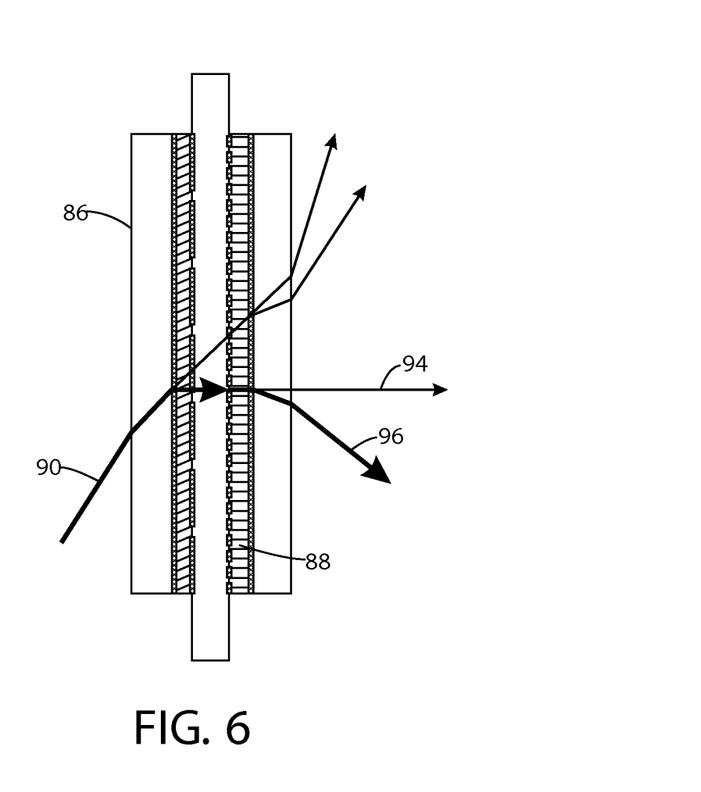
FIG. 6 is a side view of another alternative holographic phased array having a separate diffractive element and modulator for providing two stages of beam steering.

Another embodiment, illustrated in FIG. 6, uses separate diffractive element 86 and modulator 88. In this embodiment, Bragg planes in the diffractive element 86 (which may be, for example, a switchable H-PDLC or POLICRYPS grating or hologram) are tilted and spaced appropriately to diffract incident light 90 into a particular fundamental first diffracted order 94. That diffracted order is then re-diffracted upon modulation by the modulator 88, into a first sub-order 96. The line representing the predominant direction of light propagation at each stage is the heaviest; directions of light propagation that carry less light energy are represented by thinner lines. Separating the fundamental diffractive function and the modulation function in this way has both advantages and disadvantages. An advantage is that the Bragg plane tilt, spacing, and thickness in each element can be optimized for the desired predominant direction and wavelength of propagating light at that element. A disadvantage is that the cost of a two-element beam steerer will usually be greater than that of a one-element beam steerer.

Figure 7:
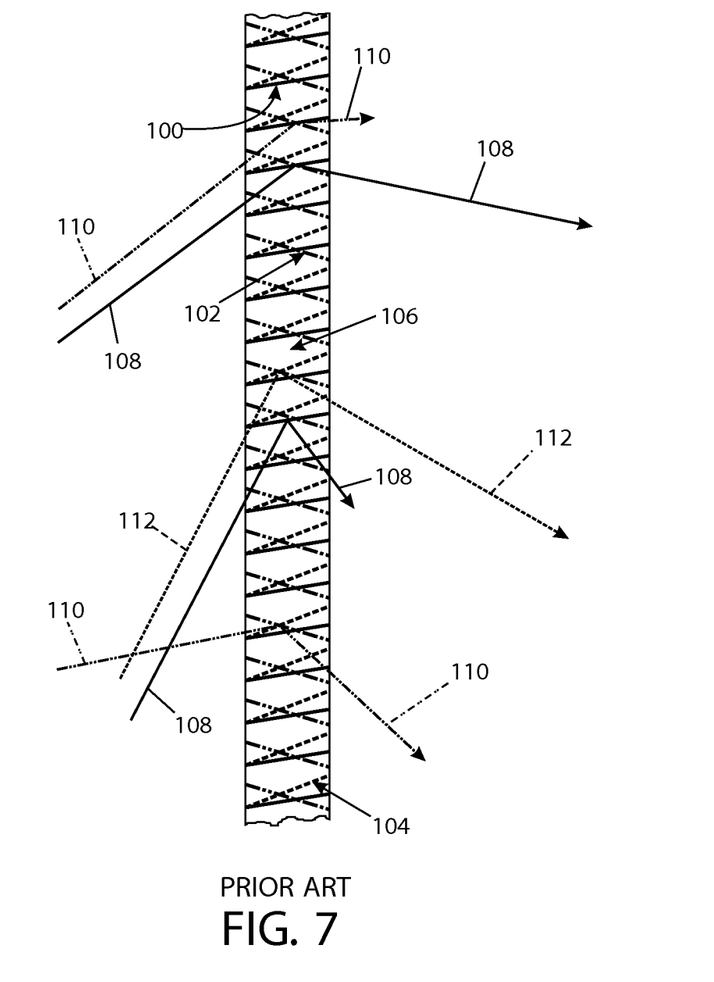
FIG. 7 is a diagram of a prior art device comprising a recording layer containing three superimposed holograms.

In the prior art, different Bragg holograms (physically superimposed or physically separated) can diffract light of different angular incidence and/or different wavelength independently into the same or different directions as illustrated in FIG. 7 where the holograms 100, 102, and 104 are superimposed within a single recording layer 106. Note that each of the holograms 100, 102, and 104 diffracts a particular wavelength beam 108, 110, or 112 efficiently only when the beam impinges from a specific angle.

Figure 8:
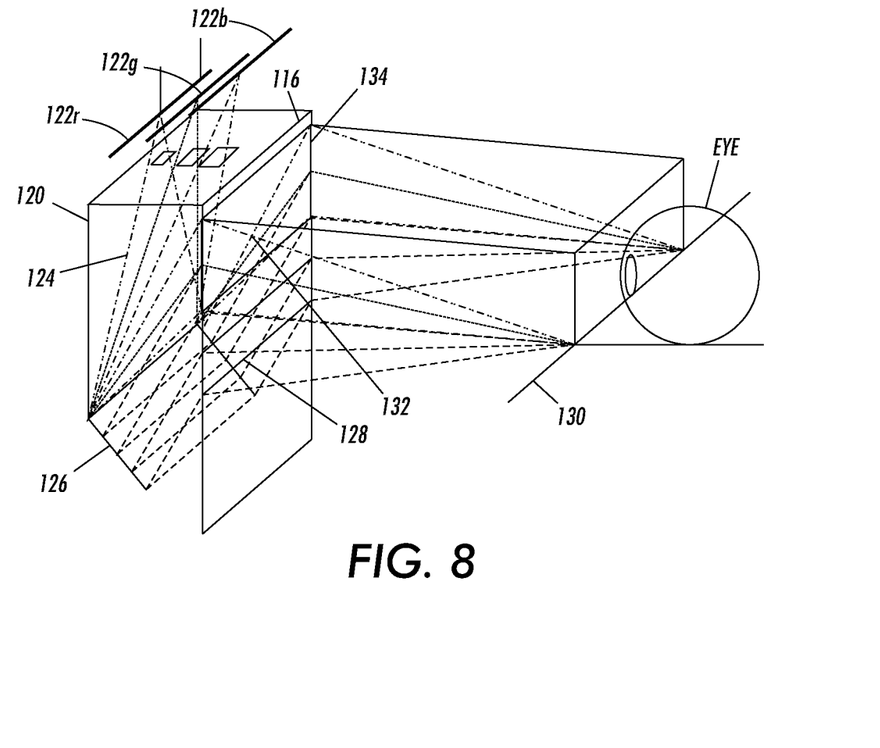
FIG. 8 shows the application of a phased array with three holograms for steering three different wavelengths of light.

In FIG. 8, three Bragg holograms are recorded in a POLICRYPS or H-PDLC structure of a diffractive layer 116 designed to receive red, green, and blue light respectively at the same TIR angle. In this configuration, each Bragg hologram diffracts its respective color of light into the same direction normal to the surface of the cover glass. If a thin hologram such as a surface relief hologram were used instead, it would diffract all three colors into different directions because of their difference in wavelength. Because Bragg holograms can be made essentially invisible to any light except light of a particular wavelength propagating in a particular direction, the three superimposed Bragg holograms used in FIG. 8 will each act only on their respective colors of light.

FIG. 8 is the application of an agile holographic optical phased array 120 such as that illustrated in FIG. 1 to a near-eye display. In this embodiment, the LED line arrays 122r, 122g, and 122b display one row of RGB video information at a time. Lens 124 and holographic optical element 126 collimate the beams from the LEDs vertically, and collimate each LED beam in an azimuthal direction corresponding to the position of the LED in its line array 122r, 122g, or 122b. The beams illustrated in FIG. 8 represent the beams from the central LEDs in the red, green, and blue arrays. A default diffractive element 128 of the diffractive layer 116 is configured to diffract and focus exiting light to a line 130, a few degrees below the viewer's eye at an angle of about 5 degrees below horizontal. A beam steerer 132 or other traveling lens is superimposed within the diffractive layer 116 to recollimate the exiting light vertically toward the pupil of a user's eye from a moving virtual window section 134 of the diffractive layer 116. The virtual window 134 formed by TIR switches in the diffractive layer 116 and the beam steerer 132 is controlled to traverse a vertical distance of around one centimeter about 30 times per second at a uniform speed while the LED line arrays 122r, 122g, and 122b display one row of RGB video frame information every 1/30,000th of a second, displaying 1,000 rows per frame, 30 frames per second.

Figure 9:
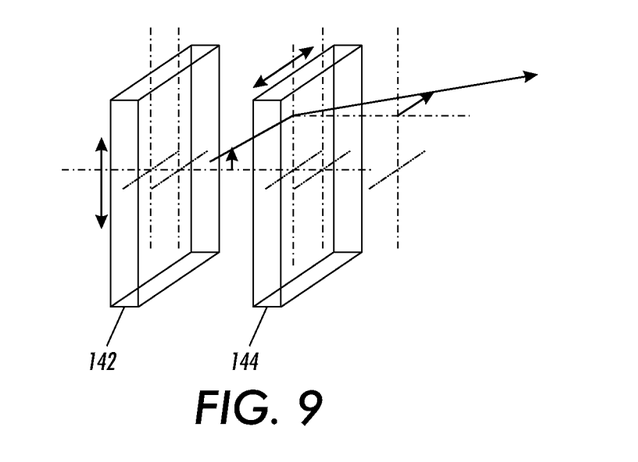
FIG. 9 depicts two phased arrays, such as shown in FIGS. 5 and 6, oriented at right angles for scanning a beam in two orthogonal planes.

Yet another embodiment of the invention, illustrated in FIG. 9, uses two beam steerers 142 and 144 such as those in FIGS. 5 and 6 in series but rotated 90 degrees relative to each other, to scan a beam in two axes.

Figure 10A:
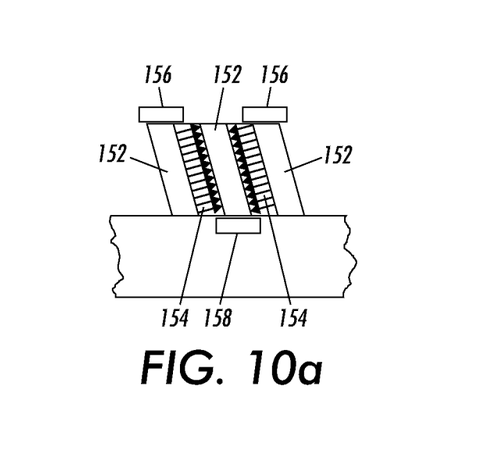
FIGS. 10a-10c of an alternative diffractive structure within the phased array in which electrically conductive transparent vanes are used as electrodes with FIGS. 10b and 10c including voltage bar charts representing the vanes being individually addressed.

Another embodiment of the invention uses electrically conductive transparent vanes 152 separated by spaces 154 filled with liquid crystal as illustrated in FIG. 10a. In this case, the electrically conductive transparent vanes 152 are used as electrodes (connected to leads 156 and 158) to apply an electric field perpendicular to the vane surfaces. This has the advantage of providing increased switching or modulation speed. This configuration is particularly suitable for fast switching or modulation of ferroelectric liquid crystals.

Two approaches to fabricating the structures of FIG. 10a are particularly useful. One approach is to use the POLICRYPS process, employing an oligomer that polymerizes to form an electrically conductive polymer. H-PDLC and POLICRYPS holograms are fabricated by exposing a layer of mixed photopolymerizable oligomer and liquid crystal to light in a stable interference pattern. During photopolymerization, the monomer diffuses toward regions in the layer being irradiated, because monomer is being removed from solution and bound into the polymer matrix there. The important difference between POLICRYPS and H-PDLC is that the POLICRYPS process is modified to ensure nearly complete removal of unreacted monomer from the regions between polymerized "vanes" 152. This leaves only liquid crystal in the spaces 154 separating the vanes 152.

Figure 10B:
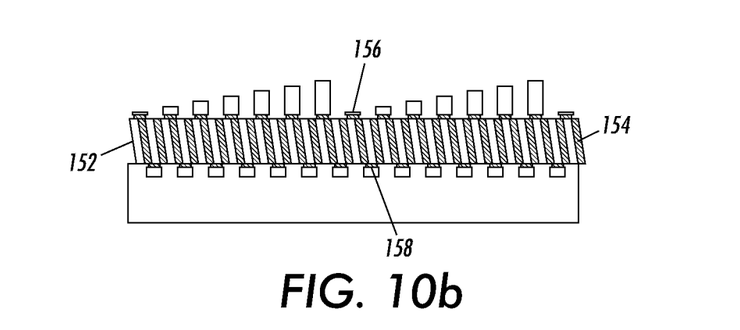
Figure 10C:
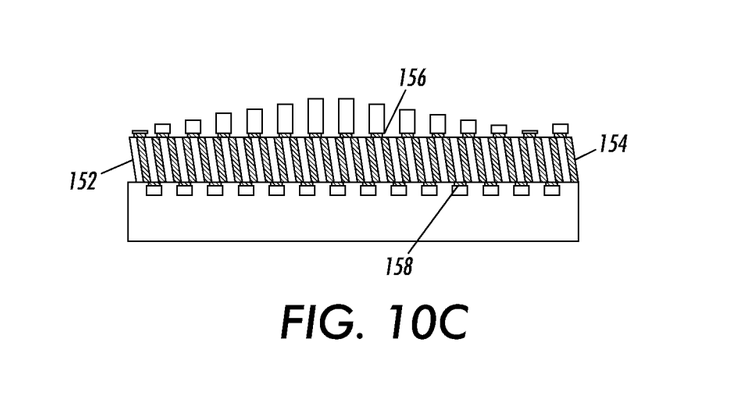

If the polymer in the vanes 152 is electrically conductive and if there are no parasitical low-resistivity electrical connections between vanes 152, the vanes 152 can serve as individually addressable electrodes. A layout like that illustrated in FIG. 10b, in which surface stripe electrodes 156 and 158 are directly at the edges of the vanes 152, can be used to electrically address the individual electrodes vanes 152 via capacitive coupling or direct electrical contact.

An alternative approach is lithographic. For example, well-known electron beam or XUV lithography techniques may be used to create high aspect ratio submicron grating structures in dielectric, metallic, or electrically conductive transparent materials. These gratings may then be filled with liquid crystals or other electro-optically active materials to form the electrically controllable diffractive structures of FIG. 10b and the other embodiments of this invention.

Alternative embodiments of the invention include applications of agile holographic optical phased arrays as lenses, beam steerers, display engines, and LIDAR antennae. In each case, one or more selected sidebands can be focused, steered, distorted or otherwise operated on by spatially and temporally modulating the phase or amplitude of one or more fundamental diffracted orders from a diffractive device.

Figure 11:
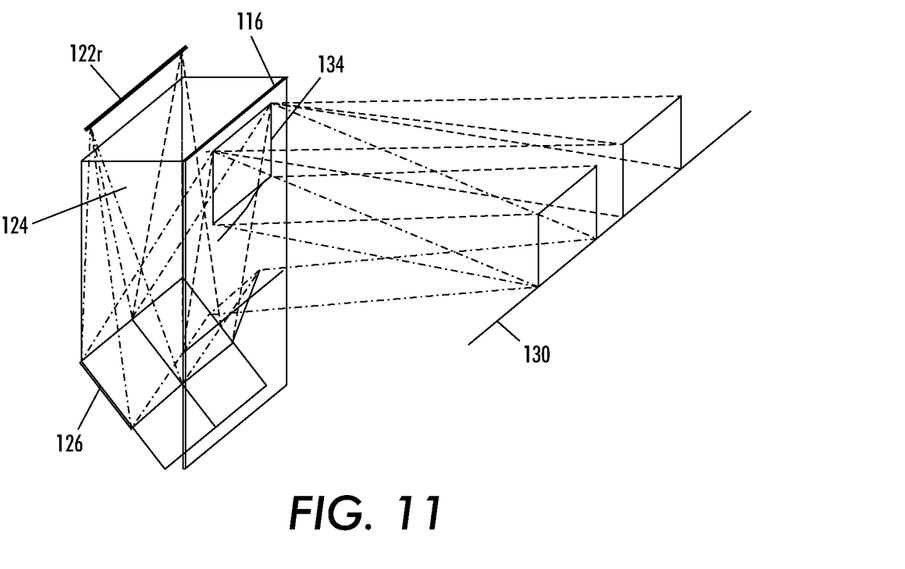
FIG. 11 shows ray bundles propagating through the phased array of FIG. 8 from light sources at opposite ends of a light source array.

FIG. 11 illustrates the azimuthal ray bundles that would be produced in the embodiment of FIG. 8 from the LEDs at the two ends of the red LED array 122r.

Figure 12:
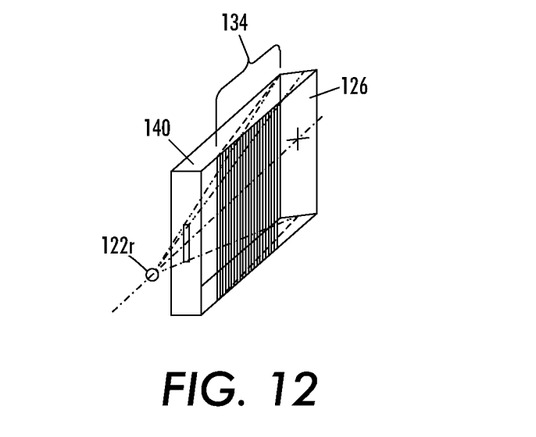
FIG. 12 depicts an alternative orientation of the phase array for displaying columns of information.

The number of lines per frame and the number of frames per second of course determines the vertical speed of the virtual window 134. Moreover, the display can be rotated 90 degrees so that the LED line array 122r displays columns of image information while a beam scanner 140 determines the column to be displayed at each instant, as illustrated in FIG. 12.

It is important to note that a Bragg hologram with extreme diffraction angles acts as a polarizer, so applications that employ down-stream optics should be designed with polarization effects in mind.

The array of electrodes can be a 2-D array, addressed by any suitable means such as photo-controlled.

"Transparent" refers to transparency with respect to the particular range of electromagnetic radiation wavelengths being manipulated by the agile holographic phased array. For example, if the agile holographic phased array is being used to manipulate visible light, "transparent" means transparent to visible light. If the agile holographic phased array is being used to manipulate infrared or terahertz radiation, "transparent" means transparent to infrared or terahertz radiation, respectively.

The invention claimed is:

1. An agile phased array for electromagnetic radiation comprising:
   a first grating structure that directs electromagnetic radiation into one or more directions,
   a spatial and temporal modulator with the capability of adjusting the phase shift undergone by electromagnetic radiation directed from the first grating structure in a predetermined spatial and temporal pattern, and
   the spatial and temporal modulator being a second grating structure at least one of whose period and amplitude are independently controllable in multiple regions on the second grating structure.

2. The agile phased array of claim 1 in which the first grating structure is filled with an electro-optically active material controllable layer to form the spatial and temporal modulator.

3. The agile phased array of claim 2 in which the first grating structure is formed by a transparent material.

4. The agile phased array of claim 3 in which the spatial and temporal modulator includes electrodes that are individually addressable in the form of a Fresnel lens.

5. The agile phased array of claim 3 in which the spatial and temporal modulator includes electrodes that are individually addressable according to a sawtooth spatial pattern.

6. The agile holographic phased array of claim 1 in which the spatial and temporal modulator includes an electro-optically controllable layer adjacent to the first grating structure and individually addressable electrodes adjacent to the electro-optically controllable layer for adjusting the phase shift undergone by electromagnetic radiation directed from the first grating structure.

7. An agile phased array for electromagnetic radiation comprising:
 a first grating structure that directs electromagnetic radiation into one or more directions,
 a spatial and temporal modulator with the capability of adjusting the phase shift undergone by electromagnetic radiation directed from the first grating structure in a predetermined spatial and temporal pattern, and
 the spatial and temporal modulator including an electro-optically controllable layer that fills spaces in the first grating structure,
 the spatial and temporal modulator including an array of transparent electrodes proximate to the electro-optically controllable layer, the electrodes being addressable so that a predetermined spatial and temporal pattern of voltages can be applied to the electrodes, thereby imposing a corresponding spatial and temporal pattern of phase and/or amplitude modulation onto electromagnetic radiation directed from the first grating structure.

8. The agile holographic phased array of claim 7 in which the first grating structure is formed by a lithographic technique.

9. The agile phased array of claim 7 in which the first grating structure is formed by a transparent material.

10. The agile phased array of claim 7 in which the transparent electrodes are individually addressable in the form of a Fresnel lens.

11. The agile phased array of claim 7 in which the transparent electrodes are individually addressable according to a sawtooth spatial pattern.

\* \* \* \* \*

UNITED STATES PATENT AND TRADEMARK OFFICE
CERTIFICATE OF CORRECTION

| | |
|---|---|
| PATENT NO. | : 8,699,137 B2 |
| APPLICATION NO. | : 13/195539 |
| DATED | : April 15, 2014 |
| INVENTOR(S) | : Stephen Paul McGrew |

It is certified that error appears in the above-identified patent and that said Letters Patent is hereby corrected as shown below:

In the Specification

In Column 5, line 28, beginning with the phrase "FIG. 4 illustrates" kindly replace the sole instance of the article "a" with the Greek character "α".

Signed and Sealed this
Sixteenth Day of September, 2014

Michelle K. Lee
*Deputy Director of the United States Patent and Trademark Office*